June 1, 1943. W. E. DUKES 2,320,855
DITCH CLEANER
Filed March 19, 1940 3 Sheets-Sheet 1

Inventor
WILLIAM E. DUKES
By Francis C. Huebner
Attorney

June 1, 1943.    W. E. DUKES    2,320,855
DITCH CLEANER
Filed March 19, 1940    3 Sheets-Sheet 2

Inventor
WILLIAM E. DUKES
By Francis C. Huebner
Attorney

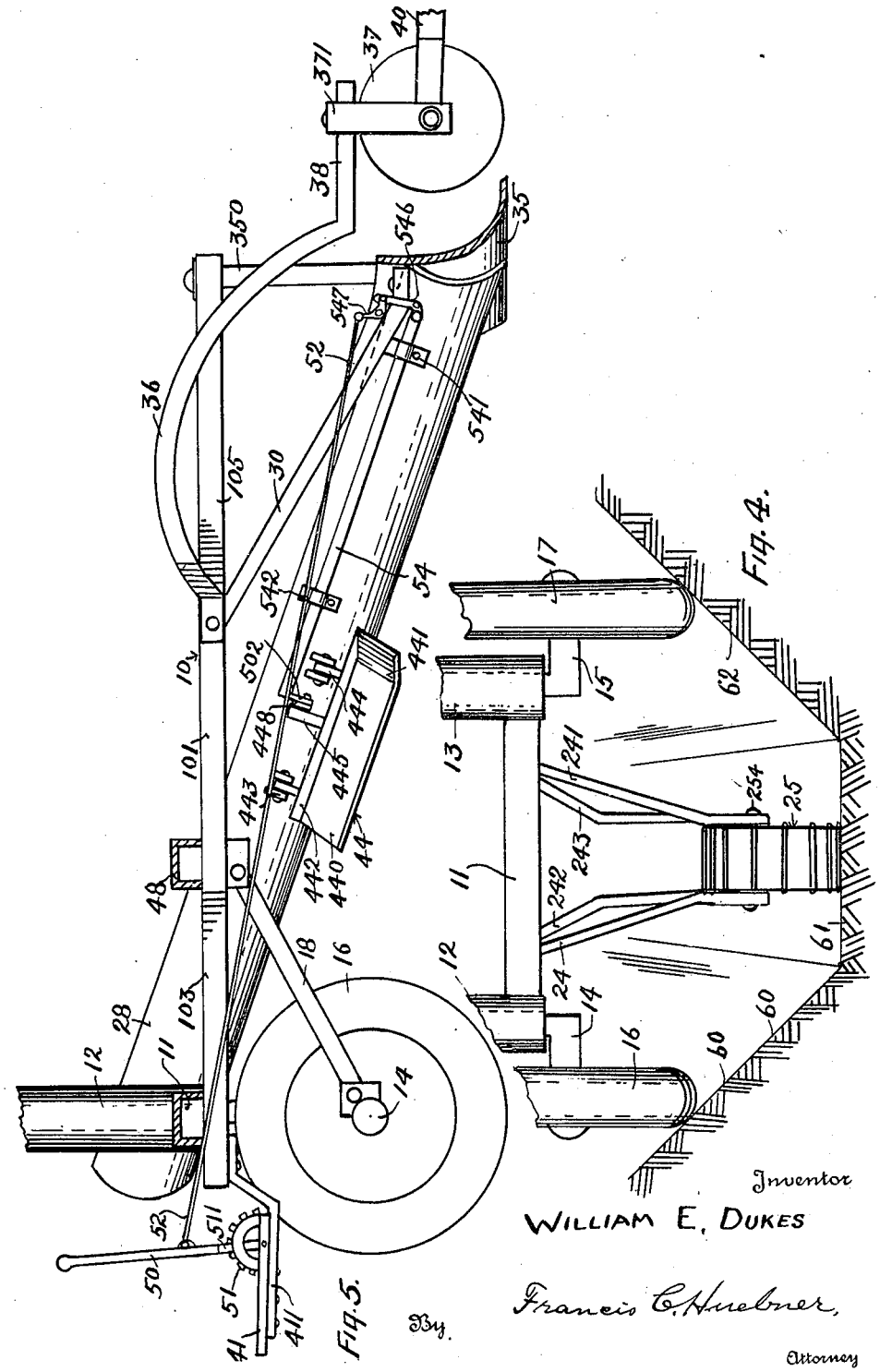

Patented June 1, 1943

2,320,855

UNITED STATES PATENT OFFICE 2,320,855

DITCH CLEANER

William E. Dukes, near Kingsburg, Calif., assignor to Consolidated Irrigation District, Selma, Calif., a corporation of California Application March 19, 1940, Serial No. 324,786

7 Claims. (Cl. 37—98)

My invention relates to a ditch digger and ditch cleaner. In portions of the country where irrigation water is extensively used hundreds of miles of ditches are necessary to convey water to the farms being irrigated. As grass, weeds, and other growths form on the banks of the ditches during the growing season, it is necessary to frequently clean the banks of such grass and debris. Heretofore machines have been devised and are now in use for scraping ditch banks. My invention relates to improvements on tools of that character whereby the same tool can be adapted and adjusted for use in either large or small ditches, both banks are cleaned at one operation, and shoes are used on the cutting blades to gage the depth of the cut and to hold the blades firmly in a cutting position even though the soil is harder on one bank than on the other, and even though tough grasses and weeds may be heavier on one bank than on the other.

Among the objects accomplished is the construction of a tool having blades on either side thereof adapted to scrape the banks of the ditch as well as the bottom, said device being adapted to work with equal efficiency in ditches having narrow bottoms as well in those ditches having wide bottoms. Another object is to produce a tool which will scrape both banks at the same time, and hold both blades in engagement with the earthen banks regardless of the fact that there may be more resistance on one bank than on the other, which might interfere with the blades cutting evenly.

Other objects will be referred to hereinafter in this specification.

These objects are accomplished by means of the device hereinafter described, and illustrated on the accompanying drawings, which are hereby made a part of this specification, in which Fig. 1 is a top plan view of the device having parts of the mechanism above the frame omitted.

Fig. 4 is a rear view of the device somewhat similar to that shown in Fig. 2, but having both of the rear wheels raised with relation to the frame so that the tool will rest and travel upon a track layer instead of on said wheels.

Fig. 5 shows a scraper blade with a shoe attached thereto, the object of said shoe being to gauge the depth of the cut of the blade.

Figure 1:
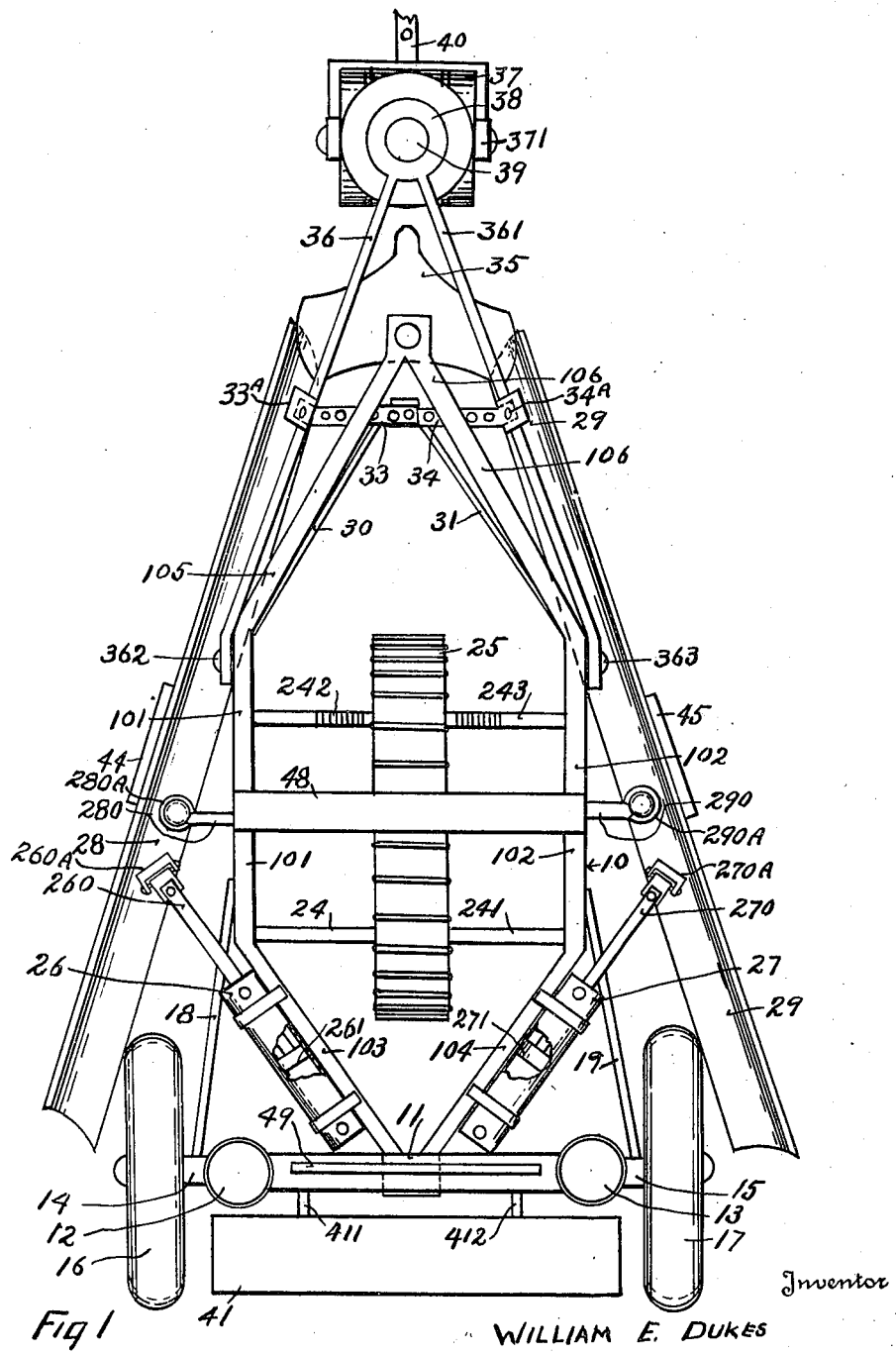
Figure 2:
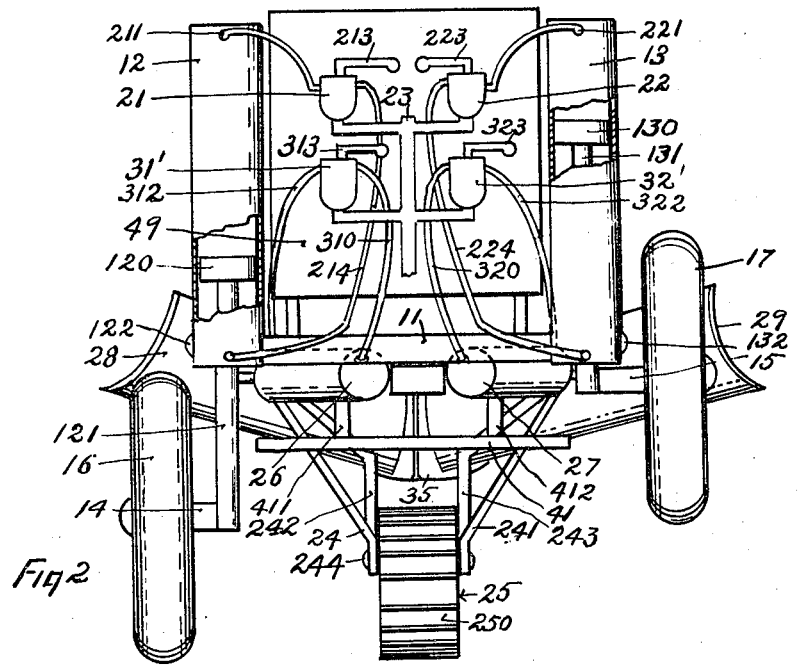
Fig. 2 is a rear view of the device omitting some of the mechanical elements not necessary in explaining the improvements I claim as new. In said Fig. 2 one of the rear wheels is shown as raised to a different level than the other wheel.
Figure 3:
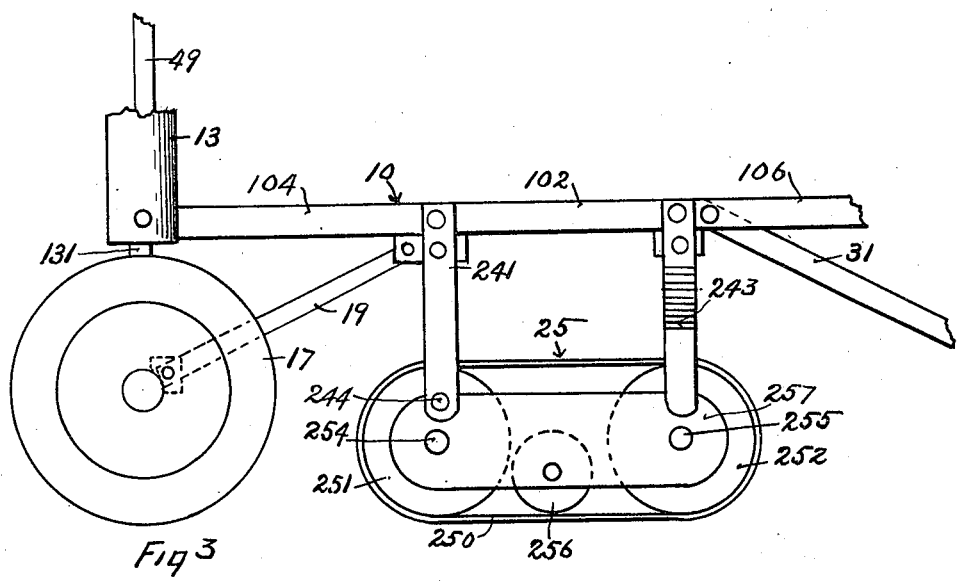
Fig. 3 is a fractional view of the device from one side thereof.

Referring to the drawings, 10 represents the frame of the device. This frame consists of two beams, having parallel portions designated 101 and 102, said parallel portions being in the approximate center of the frame. The rear ends of said beams shown as 103 and 104 converge at the rear, and the front portions 105 and 106 converge near the front of the frame. The rear end of the frame, portions 103 and 104, support a cross member 11. Cross member 11 supports a cylinder at either end thereof shown as 12 and 13. The cylinders are provided with pistons 120 and 130, and with piston rods 121 and 131. The free end of piston rod 121 is attached to a spindle 14, and the free end of piston rod 131 is attached to spindle 15. These spindles carry rear wheels 16 and 17. Spindles 14 and 15 are further braced to the frame with braces 18 and 19 which are pivotally attached at one end to the spindles, and at the other end pivotally attached to the frame. It is noted that cylinders 12 and 13 are pivotally attached to cross member 11 by means of pivots 122 and 132, such pivotal connection being necessary to permit the spindles to have an up and down movement while being braced with braces 18 and 19.

One of the objects of this device is to permit the wheels independently of each other to have an up and down movement, and to be held rigidly at any adjustment desired. For this purpose I have provided a valve board 49 which is adapted to hold a plurality of valves. The two valves regulating the movement of the rear wheels are designated 21 and 22. These valves receive fluid under pressure from a common source, not shown, through pipe 23. Valve 21 has a lead 211 to the top of cylinder 12 whereby said fluid under pressure can be introduced on the top of piston 120, pushing the piston downward, and necessarily lowering the wheel 16. A second lead from valve 21 to the lower end of cylinder 12 is adapted to convey the fluid under pressure to the under side of cylinder 12, and force the piston and wheel 16 upward. It is noted that when the wheel is thus forced either upward or downward, to the position desired, by shutting off the fluid from either of said leads the wheel will remain in said selected position.

The same character of elements are used to raise, lower and hold wheel 17, the valve being designated 22, the intake 23, the lead to the top of cylinder 13 as 221, and the lead from valve 22 to the lower portion of cylinder 13 being shown as 224.

Along the approximate center line of the frame is a tracklayer carriage 25, pivotally attached by pivot 244 to supports 24 and 241. The track layer carriage normally swings on said pivot 244 so it can automatically adjust itself to rest on the earth without regard to the elevation of the front end of the frame. Guides 242 and 243 are suspended from the frame, one guide on either side of the tracklayer carriage for the purpose of holding the carriage aligned with the frame of the device. This tracklaying carriage, 25, consists of an endless belt 250 which is carried on end wheels 251 and 252. The two end wheels of the tracklaying carriage are carried on axles 254 and 255, which axles are held by supports 257. An idler 256 is adapted to hold the center of the belt on the ground.

I have provided two scraper blades 28 and 29, which blades are supported on arms 280 and 290. These arms are preferably connected to the blades with ball and socket joints 280A and 290A so that the spaced relationship between the two scraper blades can be maintained without interfering with other adjustments of the blades. Arms 280 and 290 are slidably disposed in channel cross beam 48.

The adjustment of the spaced relation between the frame of the device and the scraper blades is governed by two hydraulic jacks, consisting of the following elements:

A cylinder 26 is held firmly to beam 103 of the frame. This cylinder is provided with a piston 261 and a piston rod 260. The piston rod is connected with scraper blade 28 with a universal hinge 260A. Valve 31' is connected with the common source of fluid under pressure. Lead 310 at one end of the cylinder, and lead 312 at the other end connect valve 31' with the two ends of cylinder 26. Handle 313 regulates the flow of the fluid under pressure through this valve to either of these leads, or closes the valve to prevent the flow of the fluid. It will be noted that when the fluid is forced into the cylinder through lead 310, the pressure against piston 261 will force the blade away from the frame, and when pressure is introduced through lead 312, the movement of the piston will be reversed and move the blade toward the frame. By cutting off the flow of the fluid from both leads 310 and 312, the piston is locked in said selected position and will hold blade 28 rigidly in such fixed position. The same arrangement of mechanism applies to cylinder 27, piston 271, piston rod 270, valve 32', and leads 23, 320 and 322.

The front ends of the scraper blades are held a spaced distance apart by means of rigid straps 33 and 34, pivotally attached at one end to scraper blades 28 and 29 with pivots 33A and 34A, the other ends of said straps being bolted together and to a support consisting of beams 30 and 31, depending from frame 10. This support is constructed of converging bars or beams 30 and 31, the converging ends forming the support for straps 33 and 34, and the ends opposite said convergence being attached to frame 10. The converging ends of beams 30 and 31 extend forward and downward from the location of attachment to the frame, and are adapted to hold the scraper blades at the front ends thereof adjacent to the bottom of the ditch. It will thus be evident that by the use of hydraulic jacks referred to, the scraper blades can be adjusted for cleaning the banks of ditches of different widths, or a ditch wider in some portions than in other portions.

A lister form of plow is carried by the portion of the frame constructed with beams 105 and 106. This lister is positioned to scrape the bottom of the ditch, and the mouldboards of the lister are positioned to slightly overlap the front ends of the scraper blades. It is here disclosed that support 30—31 is rigidly connected with beams 105 and 106, and any vertical movement of the lister plow will occasion a similar vertical movement of the front ends of the scraper blades. Means has been provided for raising and lowering the lister plow, but as such adjustment is not directly connected with the claims of my invention, it has not been illustrated on the drawings nor described in detail herein.

The hitch consists of two beams, 36 and 361 pivotally connected with frame 10 at the forward ends of beams shown as 101 and 102 on the drawings, said pivot connections being shown as 362 and 363. These beams converge at the front on a plate shown as 38 and rest on a castor wheel 37. The swivel of the castor is shown as 39. The clevis attached to the castor is shown as 40.

It will be noted that there are duplicate carriages for supporting the rear of the device, to-wit: carriage wheels 16 and 17, and the tracklaying carriage 25. The object for this duplication is as follows: Some ditches are too narrow in the bottom to operate the device therein if it was dependent entirely on the wheels 16 and 17. In such cases wheels 16 and 17 are raised sufficiently so they will not dig into the inside walls of the ditch, and the tool will be carried on the track laying carriage which has a comparatively narrow tread, and which will readily rest on the bottom of the ditch. In such position the wheels 16 and 17 are inoperative as carriage wheels, but serve as balances to keep the tool from tipping to one side or the other within limited degrees. In such cases it is noted the wheels will not disturb the dirt forming the wall of the ditch bank. If the ditch banks being scraped should have exceptionally hard soil, patches of Bermuda grass, or other obstruction on the one side and have soft dirt on the other bank, the natural tendency would be for the blade on the softer bank to cut deeper into the bank, and the blade on the side containing the obstruction would slide over the obstruction. Wheels 16 and 17 would not have enough area engaging the earth to keep the device from slipping sidewise. Applicant's device can function to raise wheels 16 and 17 so the track laying carriage will engage the earth, the side sliding of the device is thus overcome, and the blades will cut to the uniform depths without regard to the obstructions. In transporting the device, wheels 16 and 17 can be lowered so that track laying carriage 25 is off of the ground.

A platform 41 is adapted for the operator to stand upon. This platform is supported by hangers 411 and 412 suspended from frame 10.

Another feature of my device are the shoes 44 and 45 which are hingedly connected to blades 28 and 29 for the purpose of gaging the depth of the cut of the blades, and for holding the blades firmly in such cutting position. Each of these shoes consist of a sheet of metal pivotally attached to the back of the blade and adapted to be swung so that the face of the shoe will engage the plane of the earth which has been scraped by the blade passing over it. As shoes 44 and 45 bear against the banks on opposite sides of the ditch when the ditch is set for cutting the bank, said shoes have a tendency to stabilize the blades and hold them in such cutting position. One of the shoes 44 attached to the blade is illustrated in Fig. 5. Shoe 44 consists of a plate 440, having a portion 442 along the top of plate 440 bent at an obtuse angular relation to the face of said plate 440. The object of this obtuse angular flange 442 is to make the plate more rigid. The forward end 441 of plate 440 is bent on the same side of the plate as flange 442. The object of bent portion 441 is to prevent plate 440 from digging into the earth when it is dragged along the surface of the ditch bank. Instead of digging into the earth, when shoe 44 is dragged along the bank it will tend to compress the earth under the shoe.

Shoe 44 is attached to the back of the scraper blade 28 with extension hinges 443. The pivotal pins of the hinges are adjacent to the scraper blade, and as the extended leaves of the hinge are attached to shoe 44, when hinge 44 is moved on its hinges 443, the face of plate 440 is moved toward, or away from the scraper blade. As shoe 44 is constantly engaged with the earth on the ditch bank, movement of the shoe on its hinges varies the spaced distance between the face of shoe 44 and the scraper blade, and necessarily the distance between the scraper blade and the earth, thus regulating the depth of the cut of the blade.

To move shoe 44 on its hinges 443 for the purpose of thus regulating the depth of the cut of blade 28, I have constructed the following means. An arm, or post 445 is attached to, and extends from shoe 44. A rod 54 is mounted in bearings on the back of blade 28. Said rod 54 has an offset crank arm at each extremity. One of such crank arm portions 502 has a pivotal connection with an angular extension 448 on post 445, and the other crank arm portion is pivotally connected with a bell crank 546, which in turn is actuated by the chain of mechanism including bell crank 547, rod 52, and a hand lever 50 which is pivotally connected to an end of rod 52. Thus by a movement of hand lever 50, shoe 44 is drawn toward, or moved away from scraper blade 28 to which it is hingedly attached. Lever 50 can be locked in the position desired by means of a latch 511 engaging teeth of a ratchet 51.

The foregoing statement shows the use of the device for scraping the banks of ditches already excavated. It is noted that the same device is adapted to plow out and form ditches by adjusting the lister and the blades for use in a small ditch, then raise the wheels so that the tool will travel on the track layer and running the tool back and forth in the ditch being made, until the depth desired is obtained.

Having described my invention I claim:

1. A device for cleaning and constructing ditches having a frame, scraper blades pivotally mounted on either side of the frame, means for adjusting the angle of the blades with relation to the frame, means for adjusting the spaced relationship of the two blades, a carriage support for the frame consisting of rear wheels, hydraulic means for adjusting the height of the rear wheels independently of each other at the will of the operator, an auxiliary carriage support for the device consisting of a tracklaying form of carriage attached to, and suspended from the frame, parallel with the center line of the frame, and positioned between the wheels, and a shoe connected with each scraper blade, a hinge connection adapting the shoe to be pressed against the bank of earth, and means operable at will for adjusting the pressure of said shoe against the earth.

2. A device for cleaning and constructing ditches having a frame, scraper blades pivotally mounted on either side of the frame, means for adjusting the angle of the blades with relation to a center line in the frame, means for adjusting the spaced relation of the two blades, a carriage support for the frame consisting of rear and front wheels, hydraulic means for adjusting the height of the rear wheels with relation to the frame, a track laying carriage adapted as an auxiliary carriage support for the frame, said track laying carriage being pivotally attached to a support depending from the frame, said pivotal support adapting the track laying carriage to repose on the earth and support the frame when the frame has a rocking lateral movement, and when the rear wheels are raised above the level of the bottom of said tracklaying carriage.

3. A device of the character described in claim 2 in which the frame has guides attached thereto, said guides depending from the frame on either side of the track laying carriage, and adapted to hold said carriage in a line approximately parallel to the center line of the frame.

4. A device for cleaning and digging ditches consisting of a frame, scraper blades attached to and carried by said frame, means for adjusting the angular relation of the scraper blades with the frame, a carriage for said frame, said carriage consisting of a castor wheel in front and two wheels in the rear, said carriage further consisting of two independent spindles on which said wheels are mounted, hydraulic means for attaching the spindles to the frame, and for adjusting the height thereof consisting of a cylinder attached to the frame, a piston for said cylinder, and a piston rod connecting the piston with the spindle, a separate cylinder, piston and piston rod being provided for each spindle, means for introducing a fluid under pressure into either end of the cylinders at will, and an auxiliary carriage adapted to carry said device consisting of a track laying carriage attached to and depending from the frame, said hydraulic means being adapted to raise said rear wheels above the level of the auxiliary track laying carriage.

5. A device for cleaning ditches consisting of a frame, a carriage adapted to carry said frame, scraper blades mounted on either side of the frame, means for adjusting the distance apart and angular relation of said scraper blades, and a shoe hingedly connected to each scraper blade on the face thereof adjacent to the earth, said shoe being adapted to press against the earth when the device is being operated in a ditch having a wall of a bank on either side thereof, and means for regulating the angle of said shoe to the face of the scraper blade.

6. A device for cleaning and constructing ditches having a frame, a scraper blade pivotally attached to each side of the frame, means for adjusting the angular relation of the scraper blades to the frame, means for adjusting the spaced relation between the two scraper blades, a carriage support for the frame consisting of a castor at the front end of the frame, and two independent spindles attached to the frame rearwardly from said castor, each of said spindles carrying a wheel, means for adjusting the vertical height of the spindles independently of each other, and in relation to the frame, consisting of independent hydraulic jacks connecting the spindles to the frame, means for independently regulating the hydraulic jacks, an auxiliary carriage support for the frame consisting of a track layer type of carriage attached to and suspended from the frame between the rear wheels and on an approximately parallel line with the center line of the frame, said hydraulic jacks being adapted to raise and lower the spindles and wheels thereon to selective levels.

7. A device for cleaning and constructing ditches having a frame, a supporting carriage for the frame consisting of a castor wheel pivotally attached to the front end of the frame, wheels adapted to support the rear end of the frame, the means connecting the wheels with the rear end of the frame consisting of spindles adapted to rotatingly carry the wheels, a cylinder for each wheel rigidly attached to the frame, pistons fitted within the cylinders, piston rods connecting the pistons with the spindles, and hydraulic means adapted to move up and down at will the pistons, piston rods, attached spindles, and wheels, and an auxiliary carriage of the track laying type attached to the frame between said castor and the rear wheels, said auxiliary carriage being adapted to carry the frame when the auxiliary carriage rests upon the earth, and the rear wheels are raised to a position not engaging the earth.

WILLIAM E. DUKES.